(12) United States Patent
Nakaya

(10) Patent No.: US 6,424,420 B1
(45) Date of Patent: Jul. 23, 2002

(54) MEASURING DEVICE FOR ARRAYED-WAVEGUIDE DIFFRACTION GRATING

(75) Inventor: Ken-ichi Nakaya, Tokyo (JP)

(73) Assignee: NEC Corporation, Tokyo (JP)

( * ) Notice: Subject to any disclaimer, the term of this patent is extended or adjusted under 35 U.S.C. 154(b) by 119 days.

(21) Appl. No.: 09/619,663

(22) Filed: Jul. 19, 2000

(30) Foreign Application Priority Data

Jul. 19, 1999 (JP) .......................................... 11-205423

(51) Int. Cl.[7] ................................................ G01B 9/02
(52) U.S. Cl. ...................................................... 356/477
(58) Field of Search ............................... 356/73.1, 477; 250/227.19, 227.27; 385/12, 37

(56) References Cited

U.S. PATENT DOCUMENTS 6,317,214 B1 * 11/2001 Beckett et al. .............. 356/477

FOREIGN PATENT DOCUMENTS

| JP | 9-5687 | 1/1997 |
|---|---|---|
| JP | 2000-241110 | 9/2000 |

OTHER PUBLICATIONS

Takada, et al., "Optical Low Coherence Method for Characterizing Silica–Based Arrayed–Waveguide Grating Multiplexers", Journal of Lightwave Technology, vol. 14, No. 7, Jul. 1996, pp. 1677–1689.

H. Yamada, et al., "10GHz–spacing arrayed–waveguide grating with phase–error–compensating a–Si film", NTT Opto–electronics Laboratories,1996, p. 162 (with summary translated into English).

* cited by examiner

Primary Examiner—Samuel A. Turner
Assistant Examiner—Patrick Connolly
(74) Attorney, Agent, or Firm—McGinn & Gibb, PLLC

(57) ABSTRACT

The present invention provides a measuring device for an arrayed waveguide diffraction grating that enables accurate measurement of the optical path length for 1.5 $\mu$m wavelength light in an arrayed waveguide diffraction grating. The present invention's measuring device for an arrayed-waveguide diffraction grating is provided with a first light source 10; a first optical path, onto which light radiated from first light source 10 is introduced and on which an arrayed-waveguide diffraction grating 14 which is the measurement target is disposed; a second optical path, on which an optical path length varying means 18 is disposed; and a Mach-Zehnder interference optics system for causing interference in light that has passed through the first optical path and the second optical path. This device is further characterized in the provision of an light source 32; a wavelength multiplexer 16 for multiplexing light radiated from second light source 32 to a stage preceding optical path length varying device 18; a wavelength demultiplexer 20 provided to a stage proceeding optical path length varying device 18 that demultiplexes light radiated from light source 10 that is coupled to the second optical path; a light varying attenuator 36 for attenuating light radiated from light source 32 by a specific amount; and an optical coupler 38 for multiplexing light radiated from wavelength demultiplexer 20 and light varying attenuator 36.

4 Claims, 5 Drawing Sheets

MEASURING DEVICE FOR ARRAYED-WAVEGUIDE DIFFRACTION GRATING

BACKGROUND OF THE INVENTION

1. Field of the Invention

The present invention relates to a measuring device for an arrayed-waveguide diffraction grating, and in particular, to a measuring device for an arrayed-waveguide diffraction grating that demultiplexes optical signals of different wavelengths.

This application in based on patent application No. Hei 11-205423 filed in Japan, the content of which is incorporated herein by reference.

2. Description of the Related Art

Wavelength multiplex communications in which optical signals of multiple different wavelengths are multiplexed and sent in one optical fiber have entered practical application in recent years. An optical multiplexer/demultiplexer, which multiplexes and demultiplexes the light according to its wavelength, is one important element in this type of communications system.

It is conventionally known that bulk diffraction gratings, dielectric multilayers and the like may be used for this optical multiplexer/demultiplexer. However, these conventional devices have a variety of defects. Namely, the selected wavelength is difficult to set, the devices are expensive because the manufacturing steps are complicated, and they experience considerable loss. Thus, the application of these conventional devices to wavelength multiplex communications in which multiple wavelengths are multiplexed/demultiplexed is difficult.

Accordingly, in recent years, attention has been given to arrayed-waveguide diffraction gratings such as recorded in "Compilation 1, C-3, p. 162 of lectures given at the 1996 meetings of the electronics society of the Institute of Electronics, Information and Communication Engineers of Japan".

FIG. 3 is a planar view showing an example of an arrayed-waveguide diffraction grating.

As shown in FIG. 3, an arrayed-waveguide diffraction grating consists of a plurality of input waveguides 50; an input-side slab waveguide 52 onto which optical signals from input waveguides 50 are incident; an arrayed-waveguide 54 consisting of a plurality of waveguides attached to the opposite end of the input-side slab waveguide 52; an output-side slab waveguide 56 attached to the other end of arrayed-waveguide 54; and a plurality of output waveguides 58 attached to the other end of the output-side slab waveguide 56.

Optical signals being incident from input waveguides 50 are incident on the input-side slab waveguide 52, and then are incident with the same phase on arrayed-waveguide 54 consisting of a plurality of waveguides.

The input terminal of arrayed-waveguide 54 and the output terminal of input waveguides 50 are each disposed on respective circles. The radius of the circle on which the input terminal of arrayed-waveguide 54 is disposed is two-fold greater than the radius of the circle on which the output terminal of input waveguides 50 is disposed. The center of the circle on which the input terminal of arrayed-waveguide 54 is disposed is located on the circle on which the output terminal of input waveguides 50 is disposed.

Each of the waveguides in arrayed-waveguide 54 is adjusted so as to provide an equivalent interval phase difference. An output-side slab waveguide 56 is disposed to the other end of arrayed-waveguide 54. With regard to the disposition of arrayed-waveguide 54, output-side slab waveguide 56, and output waveguide 58, the output terminal of arrayed-waveguide 54 and the input terminal of output waveguide 58 are each disposed on respective circles, as was the case on the input side. The radius of the circle on which the output terminal of arrayed-waveguide 54 is disposed is two-fold greater than the radius of the circle on which the input terminal of output waveguide 58 is disposed. The center of the circle on which the output terminal of arrayed-waveguide 54 is disposed is located on the circle on which the input terminal of output waveguide 58 is disposed.

Cross-talk is one performance indicator for this arrayed-waveguide diffraction grating. This cross-talk is defined as the ratio of the optical power of a wavelength with respect to the optical power of the wavelength which is to be selected. Cross-talk expresses the signal spill-over between channels.

It is necessary to realize a low level of cross-talk in order to achieve high-quality communications. In order to realize a low level of cross-talk, the length of the optical path in arrayed-waveguide 54 (i.e., the product of length and the refractive index) needs to be controlled with an accuracy that is on the order of $\frac{1}{10}$ of the wavelength. As a result, accurate measurement of the optical path length and trimming thereof based on the results of this measurement are required.

It is known that a method employing a Mach-Zehnder interference optical system and Fourier transform demultiplexing method as disclosed in K. Takada, H. Yamada, Y. Inoue, Optical Low Coherence Method for Characterizing Silica-Based Arrayed-Waveguide, Journal of Lightware Technology, Vol. 14, No. 7., p. 1677, 1996, can be used as a method for measuring the optical path length in arrayed-waveguide 54.

FIG. 4 is a block diagram showing the structure of the conventional measuring device for an arrayed-waveguide diffraction grating.

The numeral 100 in FIG. 4 indicates a LED (light emitting diode) that radiates light of a sufficiently short coherent length having a wavelength of 1.5 μm. 102 is a LD (laser diode) that radiates light of a sufficiently long coherent length having a wavelength of 1.3 μm.

104 is an optical coupler that multiplexes the light radiated from LED 100 and LD 102, splits the light into equal intensities, and then radiates it from each of two radiating terminals. An arrayed-waveguide diffraction grating 106, which is to be measured, is connected to one radiating terminal of the optical coupler, and an optical path length varying device 108 for changing the optical path length is connected to the other radiating terminal. 110 is an optical coupler which is identical to optical coupler 104. The output terminal of arrayed-waveguide diffraction grating 106 and the output terminal of optical path length varying device 108 are connected to respective input terminals of optical coupler 110.

The above-described optical coupler 104, arrayed-waveguide diffraction grating 106, optical path length varying device 108, and optical coupler 110 form a Mach-Zehnder interference optics system.

Numeral 112 is a wavelength demultiplexer which is connected to one output terminal of optical coupler 110, and which radiates input light from different radiating terminals at each wavelength.

Optical detector 116 is connected to one of the radiating terminals of wavelength demultiplexer 112 via optical fiber 114. Optical detector 116 converts the incident optical signal to an electric signal and outputs this result. The output electric signal is output to waveform recording device 120 via signal line 118.

Optical detector 124 is connected to the other radiating terminal of wavelength demultiplexer 112 via optical fiber 122. Like optical detector 116, optical detector 124 converts the incident optical signal to an electric signal and then outputs this result. The electric signal output from optical detector 124 is input to clock generator 128 via signal line 126. Clock generator 128 outputs a frequency clock in response to the value of the electric signal that is input. Note that clock generator 128 is connected to waveform recording device 120 by signal line 130. It is also possible to record the output of clock generator 128.

The principle for measuring the optical path length of arrayed-waveguide diffraction grating 106 in the aforementioned design is as follows. Namely, light having a wavelength of 1.5 μm that was radiated from LED 100 is incident on the Mach-Zehnder interference optics system via optical coupler 104. When this light is incident on the Mach-Zehnder interference optics system, then 1.5 μm light which has propagated through the arrayed-waveguide diffraction grating 106 inside the Mach-Zehnder interference optics system, and the 1.5 μm light which has propagated through optical path length varying device 108 are coupled by optical coupler 110. The coupled signal is incident on optical detector 116 via wavelength demultiplexer 112 and optical fiber 114, and is converted to an electric signal.

Isolated beat signals are generated because of mutual interference between the coupled light. As a result, it is possible to determine the correct optical path length for the arrayed-waveguide by performing a Fourier transform on these beat signals.

In a conventional measuring device for an arrayed-waveguide diffraction grating, it is necessary to accurately measure an optical path length of 1.55 μm when moving optical path length varying device 108 at roughly a constant speed, i.e., when decreasing the optical path length at a constant proportion. The method for accurately measuring the length of the optical path for light having a wavelength of 1.5 μm will now be explained.

When light of 1.3 μm wavelength having a sufficiently long coherent length is radiated from LD 102 and is incident on the Mach-Zehnder interference optics system in FIG. 4, then the light which has propagated through each arrayed-waveguide inside the Mach-Zehnder interference optics system and the light which has propagated through optical path length varying device 108 are coupled. Isolated beat signals are generated due to interference between 1.3 μm wavelength light which has propagated through arrayed-waveguide diffraction grating 106 and the 1.3 μm wavelength light which has propagated through optical path length varying device 108. This beat signal is incident on optical detector 124 via wavelength demultiplexer 112 and optical fiber 122, and is converted to an electric signal. The converted electric signal is input to clock generator 128 via signal line 126, converted to information for changing the optical path length of 1.5 μm wavelength light by on clock generator 128, and is recorded in waveform recording device 120.

Next, the method for converting the beat signal for 1.3 μm wavelength light to information for varying the optical path length of 1.5 μm wavelength light will now be explained.

When the intensity of 1.3 μm wavelength light is denoted by P1, the intensity of 1.3 μm wavelength light is denoted by P2, the wavelength of 1.3 μm wavelength light is denoted by λ, the ratio of each of these light intensities is denoted by r=P1/P2, and the optical path length of 1.5 μm wavelength light is denoted by L, then the beat signal B (L) of 1.3 μm wavelength light generated by the device in FIG. 4 can be expressed by the following equation.

$$B(L) = \frac{1}{2}\left[\frac{(1-\sqrt{r})^2}{1+r} + \frac{4\sqrt{r}}{1+r}\cos^2\left(\frac{\pi L}{2\lambda}\right)\right]$$

Based on the preceding equation, by varying the shift length, i.e., the optical path length L with respect to 1.5 μm wavelength light, of optical path length varying device 108, then the amplitude in the above equation changes in a cyclical manner.

Thus, optical path length L of 1.5 μm wavelength light can be accurately measured to a resolution of a wavelength that is half that of 1.3 μm wavelength i.e. light wavelength of λ/2, by converting the beat signal of 1.3 μm wavelength light to an electric signal at optical detector 124 in the 1.3 μm wavelength band, and detecting the maximum and minimum values of the amplitude of the beat signal of 1.3 μm wavelength light at clock generator 128.

In order to detect the maximum and minimum values of the amplitude of the beat signal of the 1.33 μm wavelength light, it is clear that a larger amplitude for the beat signal is preferred. This condition is met when r=1, i.e., when P1=P2.

In the above-described device, light of 1.3 μm wavelength which has passed through the waveguide in arrayed-waveguide 54 which is to be measured experiences loss at the arrayed-waveguide diffraction grating which is to be measured and coupling loss between waveguides due to the alignment of the optical axis during measurement. As a result, the intensity of the light is weaker than the light which passed through optical path length varying device 108, i.e., the AMP value is smaller. Thus, problems occur such that the amplitude of the beat signal of the 1.3 μm wavelength light cannot be obtained, the amplitude maximum and minimum values cannot be detected by clock generator 128, and the optical path length of L 1.5 μm wavelength light cannot be accurately measured.

The arrayed-waveguide diffraction grating 106 that is to be measured is a wavelength demultiplexer. Thus, when the wavelength of the 1.3 μm wavelength light and the transmission band do not conform, the light intensity is significantly attenuated. A beat signal of a sufficient amplitude cannot be obtained, the maximum and minimum values of the amplitude cannot be detected at clock generator 128, and optical path length L of 1.5 μm wavelength light cannot be accurately measured.

With regard to light having a 1.3 μm wavelength that has passed through the waveguide in arrayed-waveguide 54 that is to be measured, loss in arrayed-waveguide diffraction grating 106 which is the subject of measurement will differ for each element, and the coupling loss between fiber waveguides will differ for every measurement depending on the alignment of the optical axis at this time. As a result, the intensity ratio of the light which has passed through optical path length varying device 108 is not constant, i.e., the AMP value is not constant. Thus, various problems occur, i.e., a 1.3 μm beat signal of sufficient amplitude is obtained or not obtained, the maximum value and minimum value of the amplitude can or cannot be detected at the clock generator 128, etc. As a result, the optical path length L with respect to light of wavelength 1.5 μm cannot be accurately measured.

An example of the results obtained from measurements using a conventional device will be used to explain the aforementioned problems in detail.

FIG. 5 shows an example of the results obtained when measurements are carried out using a conventional measuring device for an arrayed-waveguide diffraction grating.

LED 100 is employed as the light source for radiating light of 1.5 $\mu$m wavelength having a sufficiently short coherent length, and an LD 102 for communications use is employed as the light source for radiating light of 1.3 $\mu$m wavelength having a sufficiently short coherent length.

A 3 dB fiber coupler was employed for optical coupler 104,110, while a design was employed for optical path length varying device 108 in which a prism and a reflecting mirror are installed on a linear stage. Wavelength demultiplexer 112 employs a 1.5 $\mu$m/1.3 $\mu$m demultiplexing fiber coupler. Optical detectors 116,124 are realized using a design in which the analog-out output of a light power meter is amplified using an electric amplifier and is converted to digital by an A/D converter. A PC (personal computer) is employed for waveform recording device 120. The results obtained from this design when the beat waveform of an arrayed-waveguide diffraction grating 106 in which there are 40 waveguides is measured are shown in FIG. 5.

The amplitude of the beat waveform is on the vertical axis in FIG. 5 (the units are optional and have been normalized in the dynamic range of the A/D converter). The horizontal axis is the sampling clock for the A/D converter when optical path length varying device 108 is shifted at an approximately constant speed.

Note that the ratio between intensity P1 of the light which passed through the waveguide path which is to be measured and intensity P2 of the light which passed through optical path length varying device 108 is 2000:1. As shown in FIG. 5, the signal is buried in optical noise and electric noise during electric conversion, and the maximum and minimum values of the amplitude cannot be detected by clock generator 128. Thus, it is not possible to accurately measure the optical path length L with respect to light of wavelength 1.5 $\mu$m at a resolution of optical wavelength $\lambda$/2 for light of wavelength 1.3 $\mu$m.

SUMMARY OF TH INVENTION

The present invention was conceived in view of the above-described circumstances and has as its objective the provision of a measuring device for an arrayed-waveguide diffraction grating which can measure an accurate optical path length for light of wavelength 1.5 $\mu$m in the arrayed-waveguide diffraction grating.

In order to resolve the above problems, the present invention is a measuring device for an arrayed-waveguide diffraction grating provided with a first light source; a first optical path, onto which light radiated from the first light source is introduced and on which the arrayed-waveguide diffraction grating to be measured is disposed; a second optical path, on which an optical path length varying means is disposed; and an interference means for causing interference in light that has passed through the first optical path and the second optical path; this measuring device for an arrayed-waveguide diffraction grating being characterized in the provision of a second light source;

a first multiplexing means for multiplexing light radiated from the second light source to a stage preceding the optical path length varying means;

a demultiplexing means for demultiplexing the second light source provided to a stage proceeding the optical path length varying means and coupled to the second optical path;

an attenuating means for attenuating light radiated from the second light source by a specific amount; and a second multiplexing means for multiplexing light radiated from the demultiplexing means and the attenuating means.

The present invention is further characterized in that the attenuating means attenuates light radiated from the second light source so that it has an intensity that is 1~100 fold greater than the light radiated from the first demultiplexing means.

The present invention is further characterized in that the wavelength of the light radiated from the first light source is 1.5 $\mu$m, and the wavelength of light radiated from the second light source is 1.3 $\mu$m.

DESCRIPTION OF THE PREFERRED EMBODIMENTS

A measuring device for an arrayed-waveguide diffraction grating according to an embodiment of the present invention will now be explained in detail with reference to the figures.

Figure 1:
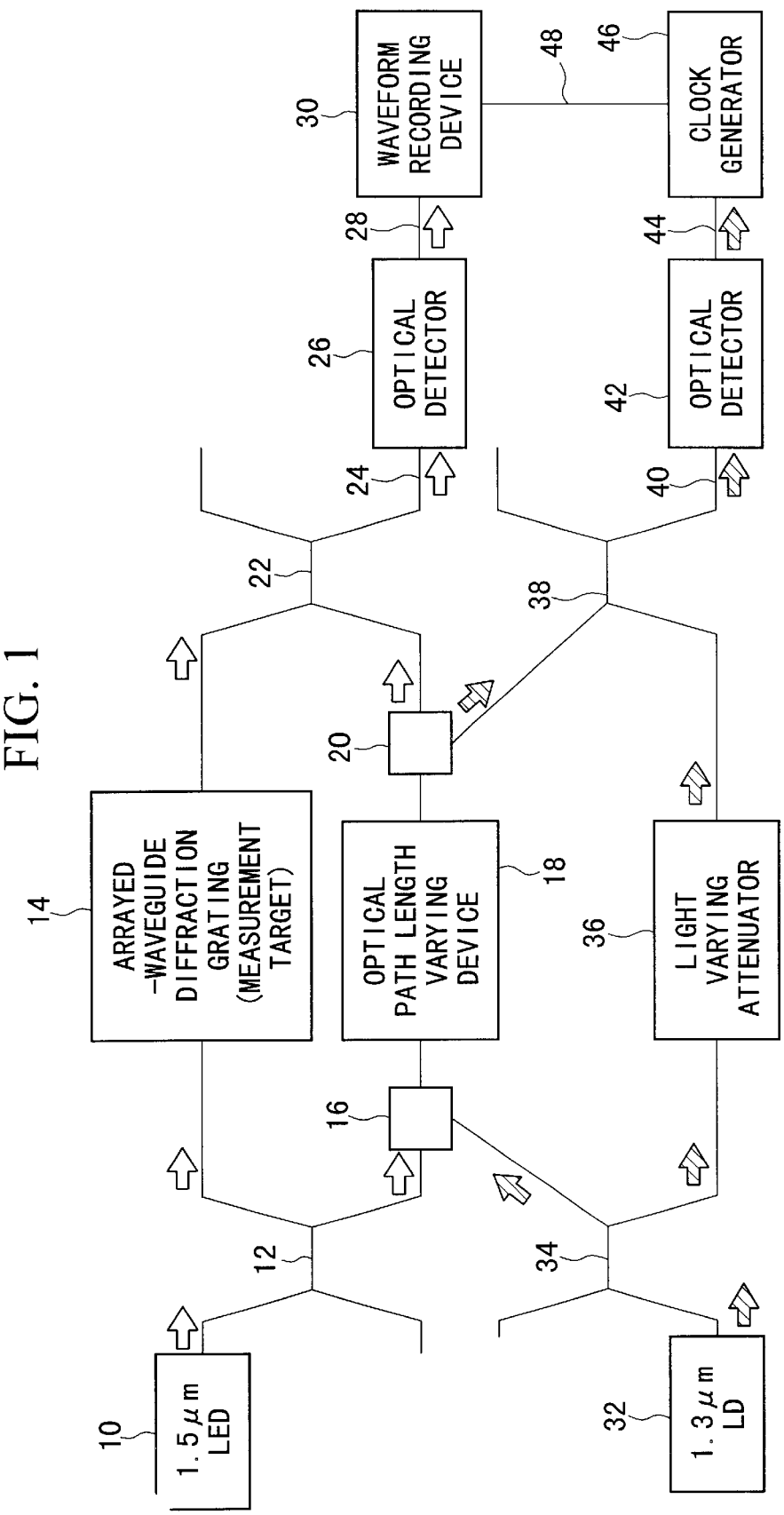
FIG. 1 is a block diagram showing the design of a measuring device for an arrayed-waveguide diffraction grating according to an embodiment of the present invention.

FIG. 1 is a block diagram showing the structure of the measuring device for an arrayed-waveguide diffraction grating according to an embodiment of the present invention.

In FIG. 1, the numeral 10 indicates a light source radiating light of wavelength 1.5 $\mu$m having a coherent length that is sufficiently short that is used to obtain the beat signal. An LED may be employed as this light source 10 for example. 12 is an optical coupler that splits the light radiated from light source 10 into equivalent intensity ratios.

Figure 3:
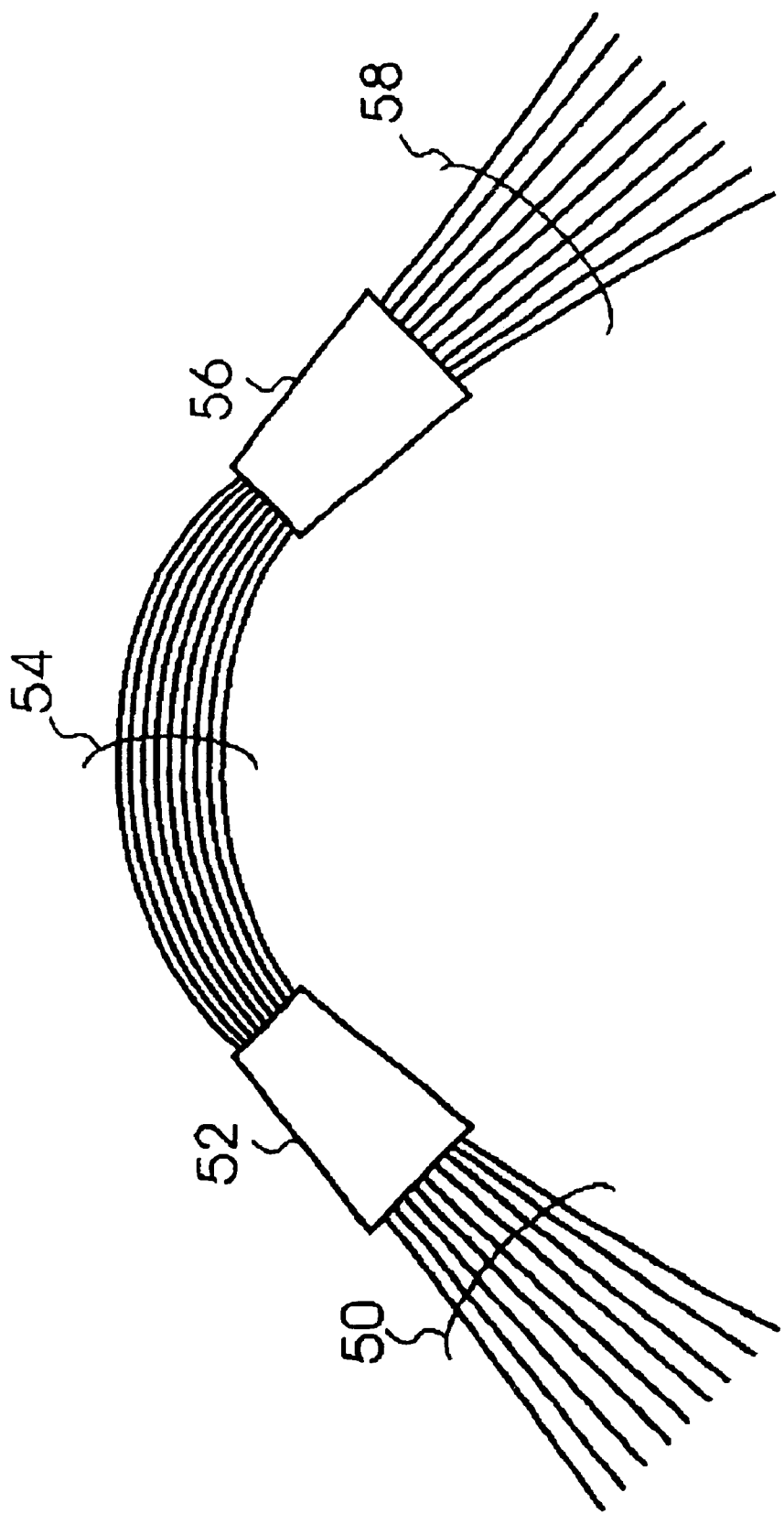
FIG. 3 is a planar view showing an example of an arrayed-waveguide diffraction grating.
Figure 4:
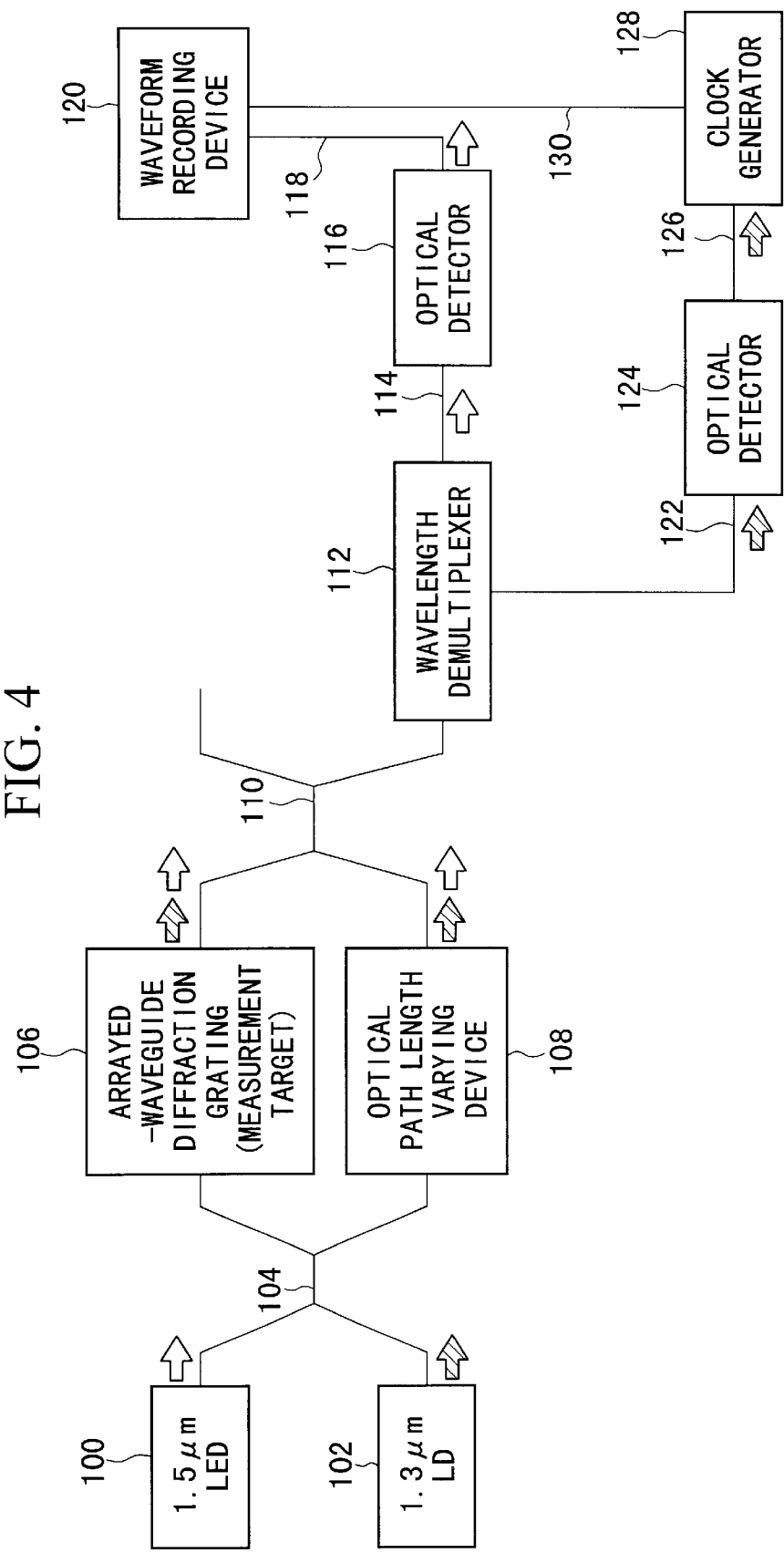
FIG. 4 is a block diagram showing the design of the conventional measuring device for an arrayed-waveguide diffraction grating.
Figure 5:
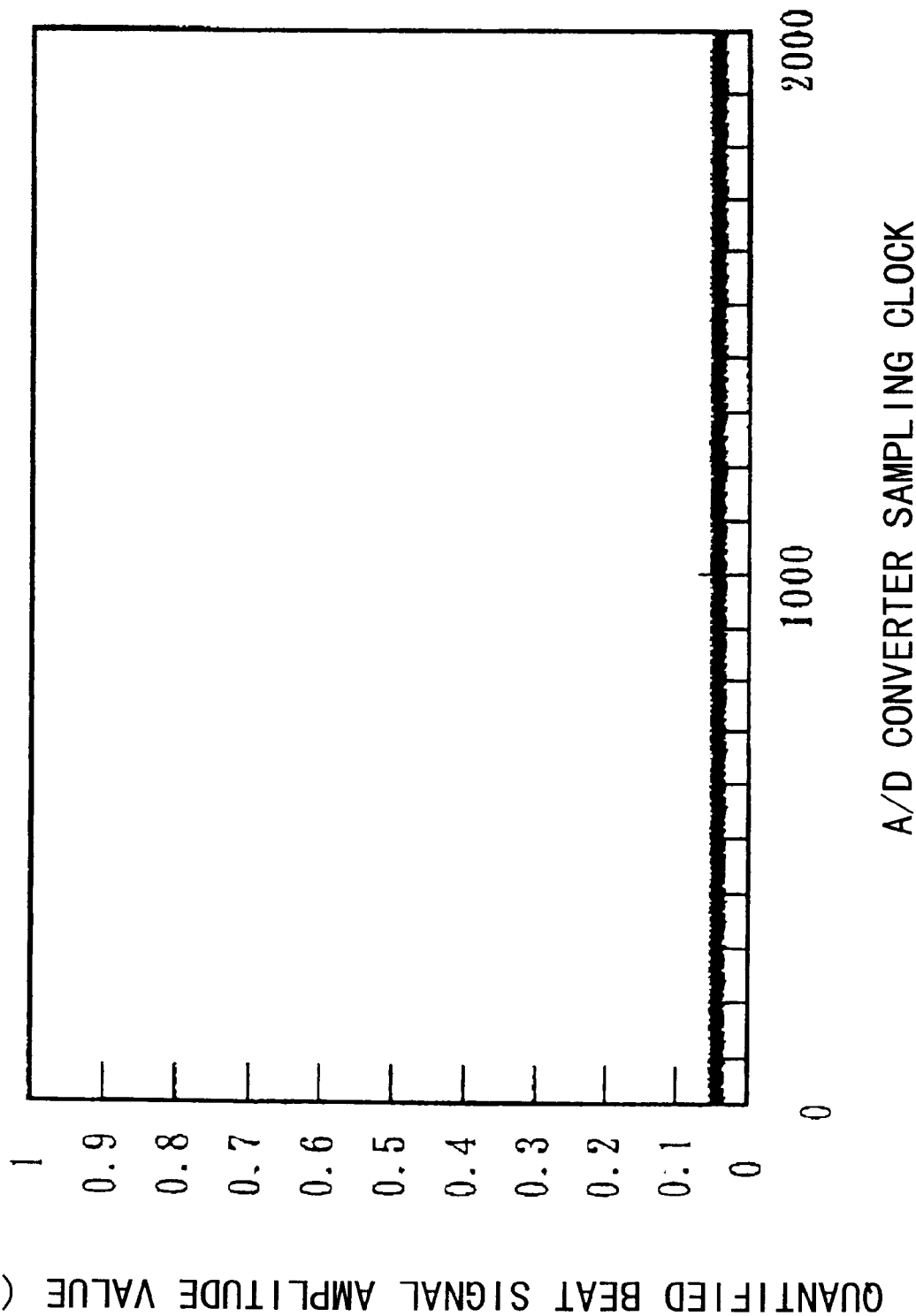
FIG. 5 is a figure showing an example of the results of measurement when measurements are performed using a conventional measuring device for an arrayed-waveguide diffraction grating.

Arrayed-waveguide diffraction grating 14 which is to be measured is connected to one radiating terminal of optical coupler 12, and wavelength multiplexer 16 is connected to the other radiating terminal thereof. This wavelength multiplexer 16 is provided to multiplex light of wavelength 1.3 $\mu$m that is radiated from light source 32 explained below with light of wavelength 1.5 $\mu$m. Optical path length varying device 18 for varying the optical path length is connected to wavelength multiplexer 16. 20 is a wavelength demultiplexer that demultiplexes light of wavelength 1.5 $\mu$m and light of wavelength 1.3 $\mu$m that has passed through optical path length varying device 18. Arrayed-waveguide diffraction grating 14 is equivalent to that shown in FIG. 3.

The numeral 22 is an optical couple that is identical to optical coupler 12. The output terminal of arrayed-waveguide diffraction grating 14 and the output terminal of wavelength demultiplexer 20 are each connected to respective input terminals of optical coupler 22.

The above-described optical coupler 12, arrayed-waveguide diffraction grating 14, wavelength multiplexer 16, optical path length varying device 18, wavelength demultiplexor 20, and optical coupler 22 compose the Mach-Zehnder interface optics system.

Optical detector 26 is connected to one of the output terminals of optical coupler 22 via an optical fiber 24. Optical detector 26 converts the incident optical signal to an electric signal and outputs this result. The output electric signal is then output to waveform recording device 30 via signal line 28.

Light source 32 radiates light of wavelength 1.3 $\mu$m having a sufficiently long coherent length which is used to accurately measure the change in the optical path length of the light passing through optical path length varying device 18. Light source 32 is connected to optical coupler 34. Optical coupler 34 splits the light radiated from light source 32 into light of equal intensity. One of the output terminals of optical coupler 34 is connected to the wavelength multiplexer 16 described above, while the other output terminal is connected to a light varying attenuator 36. Light varying attenuator 36 attenuates the light that is radiated from light source 32 and is incident via optical coupler 34 at a set variable attenuating coefficient. This light varying attenuator 36 is connected to one of the input terminals of optical coupler 38. Optical coupler 38 is identical to optical coupler 34.

The other input terminal of optical coupler 38 is connected to wavelength demultiplexor 20 described above. Thus, light of wavelength 1.3 $\mu$m that has passed through optical path length varying device 18 and light of wavelength 1.3 $\mu$m that has passed through light varying attenuator 36 are input to optical coupler 38 which multiplexes these lights. In other words, light varying attenuator 36 functions to adjust the intensity of the light of wavelength 1.3 $\mu$m that is output from optical path length varying device 18.

Optical detector 42 is connected to one of the radiating terminals of optical coupler 38 via optical fiber 40. Like optical detector 26, optical detector 42 converts the incident optical signal to an electric signal and outputs this result. The electric signal output from optical detector 42 is input to clock generator 46 via signal line 44. Clock generator 46 outputs a frequency clock according to the value of the electric signal that is input. Note that clock generator 46 is connected to waveform recording device 30 by signal line 48. It is also possible to record the output of clock generator 46.

Note that provided that an LED or an optical fiber amp radiating natural light may be employed as light source 10 provided that the device radiates light of wavelength 1.5 $\mu$m having a broad wavelength spectrum.

In addition, an LD (laser diode) or DFB-LD (Distributed Feed-Back Laser Diode) may be employed for light source 32 provided that the device radiates light of wavelength 1.3 $\mu$m having a narrow wavelength spectrum, however, it is preferable that the device have a wavelength varying function.

Wavelength multiplexer 16 and wavelength demultiplexer 20 may be 1.3/1.55 $\mu$m band wavelength demultiplexers that are used for regular optical communications. Moreover, any design is acceptable for optical detectors 26,42 provided that it is suitable for the wavelength employed. However, when the input optical signal is weak, optical detectors 26,42 must have a function to electrically amplify the signal when converting it to an electric signal. Further, when the output electric signal is an analog signal, optical detectors 26,42 must be capable of analog/digital conversion.

Next, the operation of a measuring device for an arrayed waveguide diffraction grating according to a first embodiment of the present invention in the above-described design will be explained.

In FIG. 1, light of wavelength 1.5 $\mu$m having a sufficiently short coherent length is radiated from light source 10, and is incident on a Mach-Zehnder interference optics system composed of an optical coupler 12, arrayed waveguide diffraction grating 14, wavelength multiplexer 16, optical path length varying device 18, wavelength demultiplexer 20, and optical coupler 22.

When light of 1.5 $\mu$m wavelength is incident on the Mach-Zehnder interference optics system, then the light which has propagated through each arrayed-waveguide diffraction grating 14 inside the Mach-Zehnder interference optics system and the light which has propagated through wavelength multiplexor 16, optical path length varying device 18, and wavelength demultiplexer 34 are coupled at light coupler 22. Isolated beat signals are generated due to interference between these two lights. These beat signals are incident on optical detector 26 for detecting light in the 1.5 $\mu$m band, and are converted to electric signals. The converted electric signal is then stored in waveform recording device 30. An accurate optical path length for an arrayed-waveguide forming an arrayed-waveguide diffraction grating can be determined by performing a Fourier transform on the beat signals stored in waveform recording device 30.

Light of wavelength 1.3 $\mu$m having a sufficiently long coherent length is radiated from light source 32, and is split at optical coupler 34. One part of this split light is radiated onto wavelength multiplexer 16 and the other part of the split light is radiated onto light varying attenuator 36.

One part of the split light is incident on wavelength multiplexer 16, being incident on the Mach-Zehnder interference optics system, and then propagates through optical path length varying device 18 to reach wavelength demultiplexer 20. The light is then demultiplexed and is incident on optical coupler 38.

The split light being incident on light varying attenuator 36 is attenuated by a specific attenuation coefficient and then radiated. Light radiated from wavelength demultiplexer 20 and light radiated from light attenuator 36 is multiplexed at optical coupler 38. Isolated beat signals are generated due to interference between the two lights at this time. This beat signal is incident on light detector 42 which detects light in the 1.3 $\mu$m band, is converted to an electric signal, and is converted by clock generator 46 to information for varying the optical path length of the light passing through optical path length varying device 18. This information is recorded in waveform recording device 30.

Next, a simple explanation will be made of the method for converting the beat signal for light of 1.3 $\mu$m wavelength to information for changing the optical path length of light of 1.5 $\mu$m wavelength passing though optical path length varying device 18.

When the intensity of 1.3 $\mu$m wavelength light is denoted by P1, the intensity of 1.3 $\mu$m wavelength light is denoted by P2, the wavelength of 1.3 $\mu$m wavelength light is denoted by $\lambda$, the intensity ratio for 1.3 $\mu$m wavelength light and 1.5 $\mu$m wavelength light is denoted by r=P1/P2, and the optical path length of 1.5 $\mu$m wavelength light is denoted by L, then the beat signal B (L) of 1.3 μm wavelength light measured by the device in FIG. 1 can be expressed by the following formula.

$$B(L) = \frac{1}{2}\left[\frac{(1-\sqrt{r})^2}{1+r} + \frac{4\sqrt{r}}{1+r}\cos^2\left(\frac{\pi L}{2\lambda}\right)\right]$$

From the preceding equation, by varying the shift length, i.e., the optical path length L of 1.5 μm wavelength light, of optical path length varying device 18, then the amplitude in the above equation changes in a cyclical manner.

Thus, optical path length L of 1.5 μm wavelength light can be accurately measured to a resolution of light wavelength λ/2, by converting the beat signal of 1.3 μm wavelength light to an electric signal at optical detector 42 in the 1.3 μm wavelength band, and detecting the maximum and minimum values of the amplitude of the beat signal of 1.3 μm wavelength light.

In order to detect the maximum and minimum values of the amplitude of the beat signal of the 1.33 μm wavelength light, it is clear that a larger amplitude beat signal is preferred. This condition is met when r=1, i.e., when P1=P2.

Accordingly, the optical path length L of 1.5 μm wavelength light can be accurately measured by optimizing the attenuation ratio at wavelength varying attenuator 36 so that the light intensity P1 of 1.3 μm wavelength light that has propagated through wavelength multiplexer 16, optical path length varying device 18, and wavelength demultiplexer 20, and the light intensity P2 of light of 1.3 μm wavelength that has passed through light varying attenuator 36, become equal.

Next, an example of the results obtained when measurements are carried out using the above-described embodiment will be explained.

During measurements, an LED module that radiates light of wavelength 1.5 μm having a sufficiently short coherent length was employed for light source 10, and a laser diode that variably radiates laser light of 1.3 μm wavelength having a sufficiently short coherent length was employed as light source 32 in FIG. 1. A 3dB fiber coupler was used for optical couplers 12,22,34,38, and a design in which a prism and a reflecting mirror were installed on a linear stage was employed for optical path length varying device 18. A hand-control varying attenuator was employed for wavelength varying attenuator 36, and a 1.5/1.3 demultiplexing fiber coupler was used for wavelength multiplexer 16 and wavelength demultiplexer 20. Optical detectors 26,42 are realized by means of a design which amplifies the analog out output of an optical power meter using an electric amplifier, and performs digital conversion using an A/D converter. A PC (personal computer) is employed for waveform recording device 30.

Figure 2:
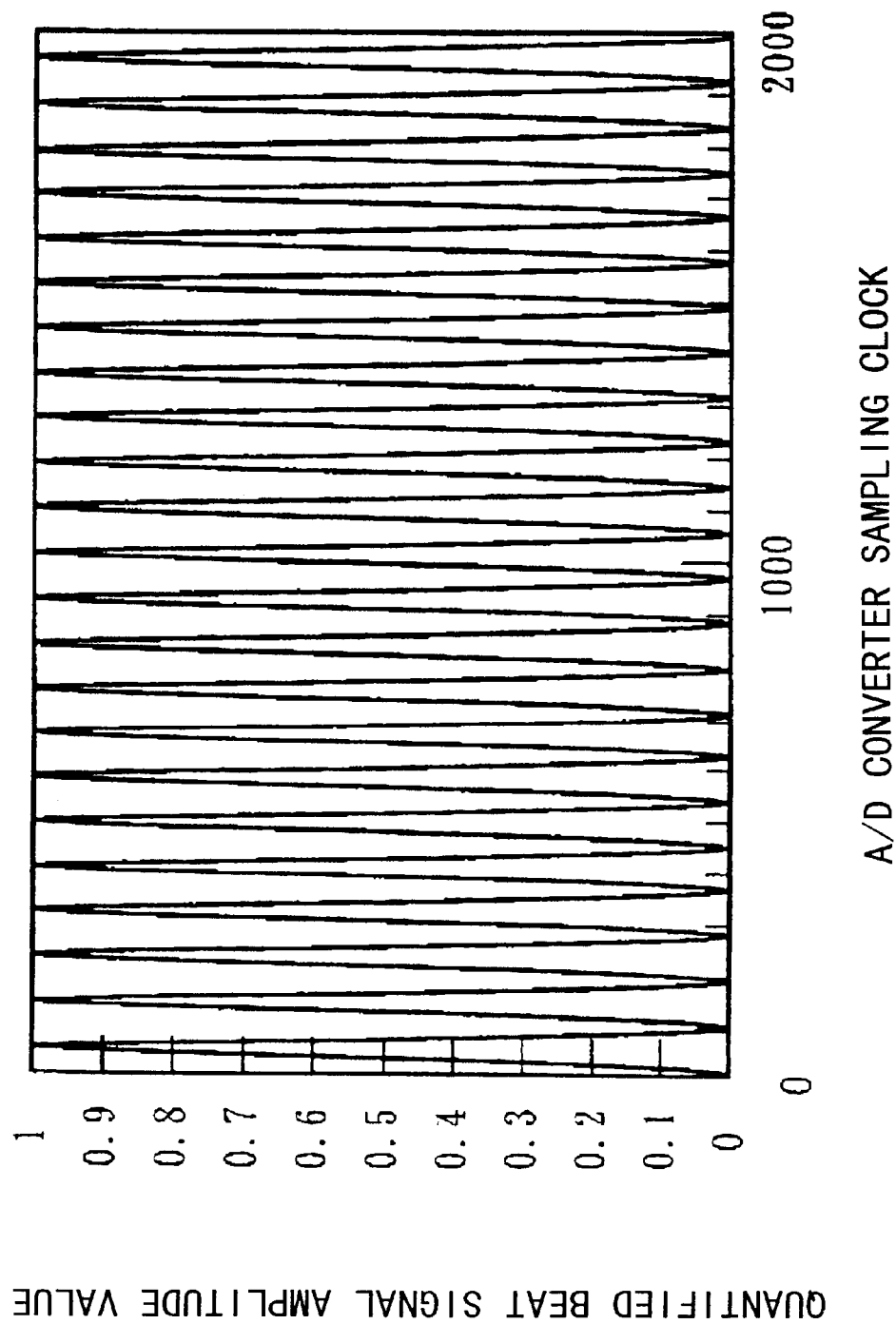
FIG. 2 is a diagram showing the results obtained for the measurement of a beat signal of wavelength 1.3 $\mu$m.

The results obtained when measuring 1.3 μm wavelength beat signals for a 40-waveguide arrayed waveguide diffraction grating 14 are shown in FIG. 2.

FIG. 2 is a diagram showing the results obtained when measuring 1.3 μm wavelength beat signals.

The amplitude of the beat waveform is on the vertical axis in the graph (optional units: normalized at the dynamic range of the A/D converter). The horizontal axis shows the sampling clock for the A/D converter when moving optical path length varying device 18 at approximately constant speed.

Light varying attenuator 36 is adjusted and the ratio of intensity P1 of 1.3 μm wavelength light that has propagated through wavelength multiplexer 16, optical path length varying device 18, and wavelength demultiplexer 20, and intensity P2 of light that has traveled through light variable attenuator 36 is set to 1:1.25. As shown in FIG. 2, a beat waveform amplitude that was approximately 99% of the dynamic range of the A/D converter could be observed.

Note that it is not absolutely essential in the present invention to adjust the wavelength varying attenuator 36 so that the ratio of intensity P1 of 1.3 μm wavelength light that has propagated through wavelength multiplexer 16, optical path length varying device 18, and wavelength demultiplexer 20, and intensity P2 of light that has traveled through light variable attenuator 36 is set to 1:1. Namely, a beat waveform amplitude that is approximately 20% or more of the dynamic range of the A/D converter can be obtained as long as wavelength varying attenuator 36 is adjusted so that this ratio is in the range of 1:100~1:1.

As explained above, the present invention enables accurate setting of the optical path length for an optical path length varying means by using light radiated from a second light source. As a result, accurate measurements are enabled when measuring an arrayed waveguide diffraction grating using a first light source.

What is claimed is:

1. A measuring device for an arrayed-waveguide diffraction grating provided with a first light source; a first optical path, onto which light radiated from said first light source is introduced and on which the arrayed-waveguide diffraction grating to be measured is disposed; a second optical path, on which an optical path length varying means is disposed; and an interference means for causing interference in light that has passed through said first optical path and said second optical path; said measuring device for an arrayed-waveguide diffraction grating being characterized in the provision of:

a second light source;

a first multiplexing means for multiplexing light radiated from said second light source to a stage preceding said optical path length varying means;

a demultiplexing means provided to a stage proceeding said optical path length varying means, for multiplexing said second light source coupled to said second optical path;

an attenuating means for attenuating light radiated from said second light source by a specific amount; and a second multiplexing means for multiplexing light radiated from said demultiplexing means and said attenuating means.

2. A measuring device for an arrayed-waveguide diffraction grating according to claim 1 characterized in that said attenuating means attenuates light radiated from said second light source so that it has an intensity that is 1~100 fold greater than the light radiated from said first demultiplexing means.

3. A measuring device for an arrayed-waveguide diffraction grating according to claim 1 characterized in that said wavelength of the light radiated from said first light source is 1.5 μm, and the wavelength of light radiating from said second light source is 1.3 μm.

4. A measuring device for an arrayed-waveguide diffraction grating according to claim 2 characterized in that the wavelength of the light radiated from said first light source is 1.5 μm, and the wavelength of the light radiated from said second light source is 1.3 μm.

* * * * *